US006646411B2

United States Patent
Hirono et al.

(10) Patent No.: US 6,646,411 B2
(45) Date of Patent: Nov. 11, 2003

(54) CONTROL METHOD OF COMPRESSOR MOTOR AND INVERTER EQUIPPED WITH THE SAME METHOD

(75) Inventors: Daisuke Hirono, Isesaki (JP); Ichirou Kuwabara, Isesaki (JP); Yuuji Yoshii, Isesaki (JP)

(73) Assignee: Sanden Corporation, Gunma (JP)

( * ) Notice: Subject to any disclaimer, the term of this patent is extended or adjusted under 35 U.S.C. 154(b) by 10 days.

(21) Appl. No.: 10/012,417

(22) Filed: Dec. 12, 2001

(65) Prior Publication Data

US 2002/0117992 A1 Aug. 29, 2002

(30) Foreign Application Priority Data

Dec. 27, 2000 (JP) ...................... P2000-396653

(51) Int. Cl.[7] .............................. H02P 7/42; H02P 5/34
(52) U.S. Cl. .................... 318/801; 318/809; 318/757
(58) Field of Search .......................... 318/801, 374, 318/809, 375, 758, 757, 434, 439, 254, 921, 158, 139; 388/800, 806, 815, 821, 823

(56) References Cited

U.S. PATENT DOCUMENTS

| | | | | |
|---|---|---|---|---|
| 3,568,026 A | * | 3/1971 | Anna | ............................ 388/833 |
| 3,913,346 A | | 10/1975 | Moody, Jr. et al. | |
| 4,263,988 A | * | 4/1981 | Inaba et al. | .................. 187/297 |
| 4,319,171 A | | 3/1982 | Motoori | |
| 4,633,151 A | | 12/1986 | Crook | |
| 4,792,736 A | * | 12/1988 | Jimbo et al. | ................. 388/801 |
| 4,808,078 A | | 2/1989 | Havens et al. | |
| 4,903,497 A | | 2/1990 | Zimmern et al. | |
| 4,906,884 A | | 3/1990 | Teshigawara | |
| 4,936,112 A | | 6/1990 | Miller | |
| 5,006,045 A | | 4/1991 | Shimoda et al. | |
| 5,103,652 A | | 4/1992 | Mizuno et al. | |
| 5,329,788 A | | 7/1994 | Caillat et al. | |
| 5,350,039 A | | 9/1994 | Voss et al. | |
| 5,436,547 A | | 7/1995 | Nagai et al. | |
| 5,569,988 A | * | 10/1996 | Kokami et al. | .............. 318/254 |
| 5,640,073 A | | 6/1997 | Ikeda et al. | |
| 5,782,610 A | | 7/1998 | Ikeda | |
| 5,857,348 A | | 1/1999 | Conry | |
| 6,086,335 A | | 7/2000 | Bass et al. | |
| 6,112,535 A | | 9/2000 | Hollenbeck | |
| 6,202,428 B1 | | 3/2001 | Katayama et al. | |
| 6,321,563 B1 | | 11/2001 | Ikeda et al. | |

* cited by examiner

Primary Examiner—Robert E. Nappi
Assistant Examiner—Renata McCloud
(74) Attorney, Agent, or Firm—Baker Botts L.L.P.

(57) ABSTRACT

A control device for a compressor motor and an inverter according to the present invention monitors the amplitude of a phase current of a three-phase DC motor. As the amplitude of the phase current approaches an overload condition of the inverter or motor, the control device decreases the rotational velocity of the motor by a predetermined rotational deceleration. By reducing the rotational velocity of the motor by a certain deceleration, the control device of the present invention ensures that the motor load, i.e., the amplitude of the phase current, does not reach or exceed an overload condition. By use of this device, it is possible to suppress or reduce effectively the frequency of motor stops caused by an increase in the phase current.

18 Claims, 3 Drawing Sheets

CONTROL METHOD OF COMPRESSOR MOTOR AND INVERTER EQUIPPED WITH THE SAME METHOD

BACKGROUND OF THE INVENTION

1. Field of the Invention

The present invention relates to an inverter which drives a motor-driven compressor for use in a vehicle air conditioning apparatus. More particularly, this invention relates to a control method that effectively reduces the frequency with which the compressor motor is stopped due to an overload condition. Moreover, the present invention relates to an inverter configured to perform the control method of the present invention.

2. Description of Related Art

In FIG. 1, a known motor-driven compressor 1 and an inverter 2 for use in a vehicle air conditioning system are shown. Motor-driven compressor 1 comprises a compressor 11 and a three-phase, direct current (DC) motor 12, which drives compressor 11. Inverter 2 comprises a smoothing condenser 22, three pairs of switching elements 21a–21f (NPN-type transistors), a shunt resister 23, and a motor drive controller 24. Inverter 2 is supplied with DC electrical power from a DC battery 3. Motor drive controller 24 comprises a central processing unit (CPU) 26, an analog-to-digital (A/D) converter 25, a memory 27, a motor position detector 29, and a control signal generator 28. When a rotational frequency command signal 31 is input to CPU 26 from an external device (not shown), CPU 26 outputs a signal 32 to control signal generator 28 in accordance with a program stored in memory 27. Control signal generator 28 activates specific combinations of switching elements 21a–21f sequentially in accordance with a specific order.

When combinations of switching elements 21a–21f are activated sequentially, three-phase, DC current flows into the coils of motor 12, and motor 12 begins to rotate. As motor 12 rotates, a counter-electromotive force (back-emf) is generated on the terminals of motor 12. The back-emf is input to motor position detector 29, and then is translated into a signal 33 which provides an indication of a rotational position of a rotor of motor 12. When CPU 26 receives signal 33 from motor position detector 29 and calculates a rotational position of the rotor, CPU 26 generates a new signal 32 for controlling switching elements 21a–21f. Thus, CPU 26 may calculate rotational frequency of motor 12 based on signal 33 which is output from motor position detector 29. When a current flows into motor 12, it also flows through shunt resister 23, which is located on a return path of the current. This current Ip flowing through shunt resister 23 is called a phase current, and a potential difference develops across shunt resister 23. This potential difference is proportional to the phase current and is input to A/D converter 25. Thus, by monitoring the amplitude of current Ip, CPU 26 controls signal 32, which further controls switching elements 21a–21f, so that the current Ip does not exceed a certain level.

A known, main control program of inverter 2 may be stored in memory 27 of motor drive controller 24. This known control program operates as follows. As mentioned above, CPU 26 monitors the amplitude of the current Ip. When a load corresponding to an air conditioning parameter increases, e.g., when the ambient temperature rises, a load on compressor 11 and on motor 12 also increases. Generally, the current Ip, which flows through motor 12, is proportional to a rotational load on motor 12.

By monitoring the amplitude of the current Ip, CPU 26 may detect that a rotational load on motor 12 has increased. The amplitude of the current Ip, which may flow through motor 12 and inverter 2, is limited by (1) a rated current of motor 12; (2) a rated current of switching elements 21a–21f; (3) a rated current of conducting wires, which connect these devices; and (4) a rated current of the connectors between these devices. When an amplitude of current Ip approaches the rated current of motor 12 and inverter 2, CPU 26 then lowers the rotational frequency of motor 12. However, because the magnitude of the load on motor 12 varies, after a period of delay, in response to a change in the rotational frequency of motor 12, the motor load continues to increase for some period after the rotational frequency of motor 12 is lowered. As a result, the amplitude of the phase current Ip may continue to increase, and it may exceed a rated current of inverter 2 or motor 12.

When the amplitude of the phase current Ip exceeds a rated current of inverter 2 or motor 12, CPU 26 ceases to activate control signal generator 28 and, thus, switching elements 21a–21f. This action by CPU 26 stops drive motor 12. If motor 12 is stopped abruptly during the operation of the vehicle air conditioning system, warm air may be discharged from a port of the air conditioning system. In addition, motor 12 may be restarted after a predetermined period of time elapses from the time at which motor 12 was first stopped. Thus, according to known methods for controlling an inverter, motor stoppage may occur more frequently whenever an amplitude of the current Ip approaches a limit value, i.e., a rated value of inverter 2 or motor 12.

SUMMARY OF THE INVENTION

A need has arisen to provide an improved control method for an inverter that drives a motor-driven compressor. A further need has arisen for a control method that reduces the frequency with which a motor is stopped upon the approach of an overload condition. Moreover, a need has arisen to provide an inverter configured to perform this control method. According to the control method of the present invention, at least five set points related to the amplitude of the phase current may be preset. The first set point among the five set points is one of (1) the rated current of the switching elements, (2) the rated current of the motor, or (3) the rated current of the conducting wires and connectors which connect these devices. According to the method of the present invention, when the amplitude of the phase current exceeds this first or greatest set point, activation of the motor is stopped. When the amplitude of the phase current falls below the lowest of the five set points, the rotational frequency of the motor is accelerated by a predetermined degree of acceleration.

The remaining three intermediate set points are located between the first set point and the lowest set point. The intermediate set points define subintervals between the first set point and the lowest set point. When the amplitude of the phase current enters one of the subintervals defined by these three intermediate set points, the motor is accelerated by various negative degrees of accelerations (i.e., the motor is decelerated) predetermined and defined for each of the subintervals. Because the control method of the present invention steadily decreases rotational velocity of the motor by a certain deceleration before the amplitude of the phase current exceeds the first or largest set point, the method of the present invention effectively reduces the occurrence of motor stoppage as an overload condition approaches.

In an embodiment of this invention, a control device of an inverter includes a plurality of switching elements for driving a three-phase DC motor in response to a rotational frequency, command signal received from an external device. The rotational velocity and the rotational acceleration of the motor are determined from signals which are in response to a back-emf received from the DC motor as it rotates. The amplitude of the phase current of the motor is determined, as well. When the amplitude of the phase current exceeds a first set point, activation of the motor is stopped. When the amplitude of the phase current is less than the first set point but greater than a second set point, which is less than the first set point, the rotational velocity of the motor is decelerated at a predetermined rate. When the amplitude of the phase current is less than a third set point, which is smaller than the second set point, the rotational velocity of the motor is accelerated at a predetermined rate.

In another embodiment of this invention, an inverter for performing the control method of the present invention is provided. The inverter includes a plurality of switching elements for driving a three-phase DC motor based on a rotational frequency command signal received from an external device. A calculator is provided for calculating rotational velocity and rotational acceleration of the motor from signals, which are based on a back-emf received from the motor as it rotates. A detector is provided for determining an amplitude of the phase current of the motor. Moreover, a control program having an overload suppression routine is provided. The overload suppression routine operates as follows. When the amplitude of the phase current exceeds a first set point, the routine stops activation of the motor. When the amplitude of the phase current is less than the first set point, but greater than a second set point, which is smaller than the first set point, the routine decelerates the rotational velocity of the motor at a predetermined rate. When the amplitude of the phase current is less than a third set point, which is smaller than the second set point, the routine accelerates the rotational velocity of the motor at a predetermined rate.

In a further embodiment of this invention, a method of controlling an inverter-driven compressor motor is provided. The method of the present invention calculates a rotational velocity and a rotational acceleration of the motor, in response to back-emf signals of the motor. Moreover, the method detects an amplitude of a phase current of the motor. When the amplitude of the phase current exceeds a first set point (e.g., first set point I1), the control method stops activation of the motor. When the amplitude of the phase current is less than the first set point (e.g., first set point I1), but greater than a second set point (e.g., second set point αI2), which is less than the first set point (e.g., first set point I1), the control method decelerates the rotational velocity of the motor at a predetermined rate. Moreover, when the amplitude of the phase current is less than a third set point αI3, which is less than the second set point αI2, the control method accelerates the rotational velocity of the motor at a predetermined rate.

Other objects, features, and advantages of embodiments of this invention will be apparent to, and understood by, persons of ordinary skill in the art from the following description of preferred embodiments with reference to the accompanying drawings.

BRIEF DESCRIPTION OF DRAWINGS

The invention may be more completely understood by reference to the following figures.

DETAILED DESCRIPTION OF PREFERRED EMBODIMENTS

Figure 2A:
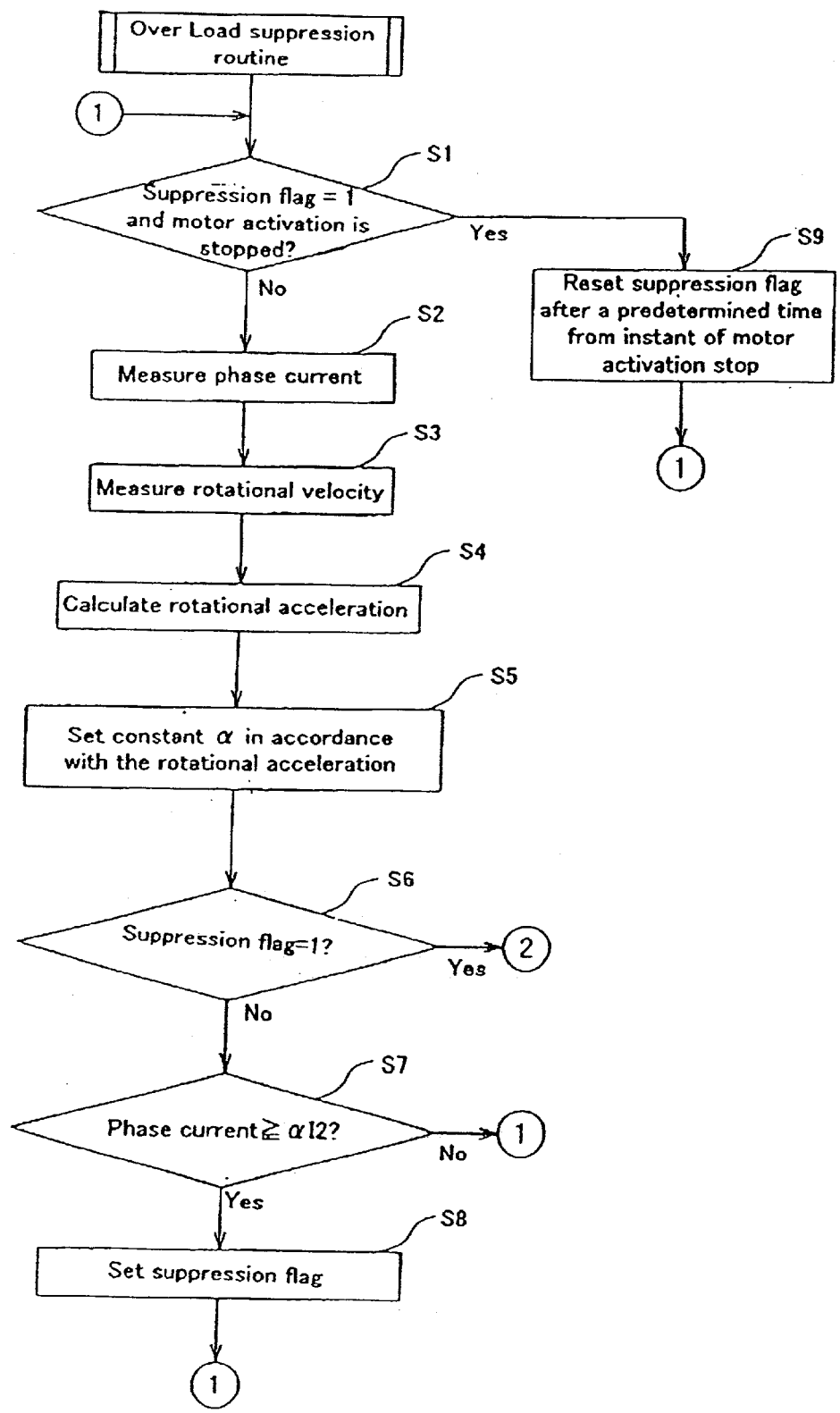
FIGS. 2a and 2b show the operation of a control routine of an inverter according to the present invention.
Figure 2B:
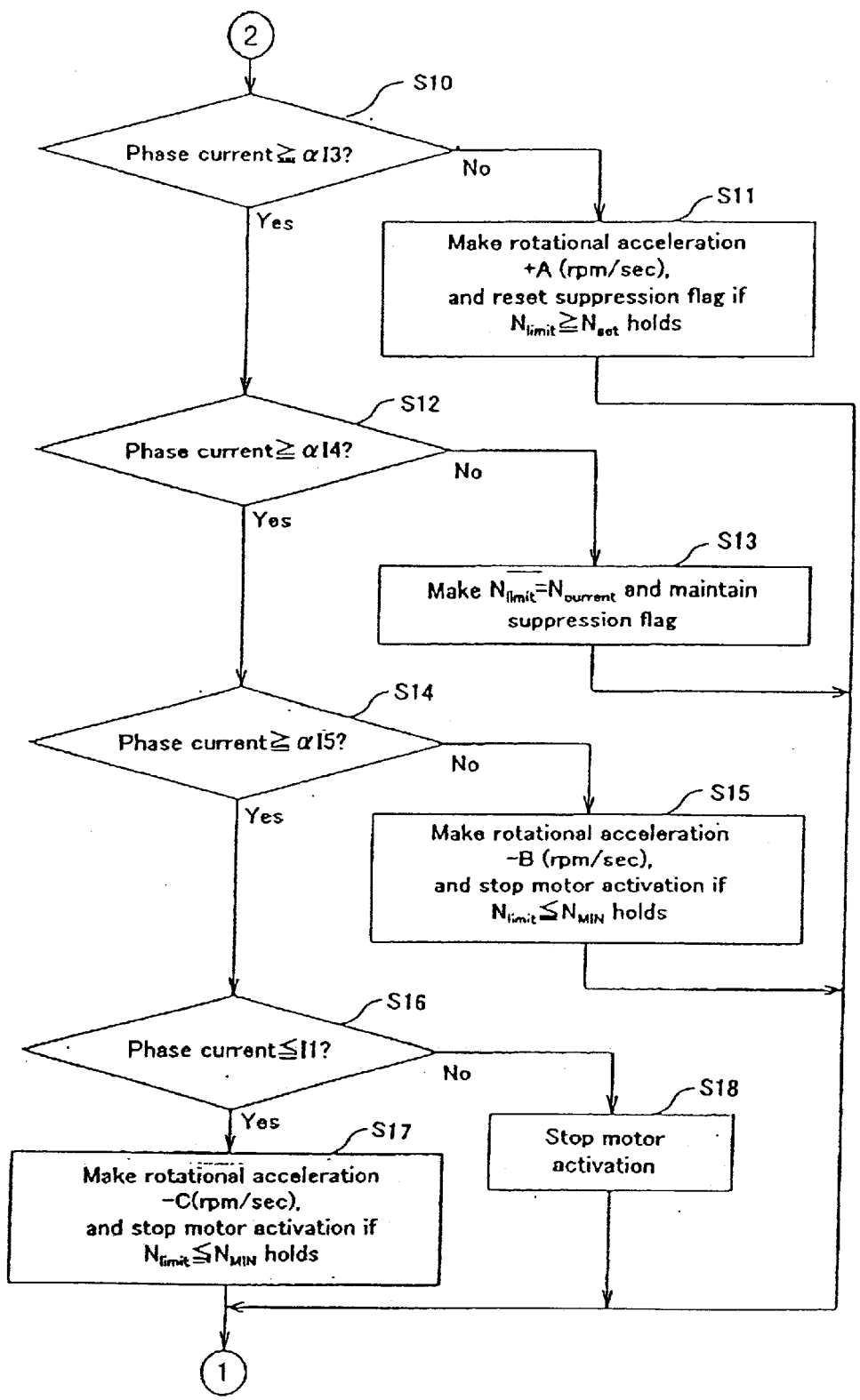

FIGS. 2a and 2b depict a control routine for suppressing or reducing an overload state of a motor according to the present invention. This overload suppression control routine may be incorporated into a main program of an inverter. Operation of the main program of an inverter is known in the art, see, e.g., U.S. Pat. No. 5,436,547. Therefore, a discussion of the operation of the known main program is omitted from the present invention With reference to FIG. 2a, at step S1, a determination is made whether or not the current state is in an overload suppression mode. The condition "Suppression flag=1" means that the current state is in an overload suppression mode. On the other hand, if the suppression flag equals zero, then an overload suppression mode is canceled. The control routine proceeds to step S9 if the suppression flag equals 1 and if the motor activation is stopped. In step S9, the suppression flag is reset after a predetermined period of time from the instant when the motor activation was stopped. Control of re-start of the motor is included in the main program. Therefore, an explanation of the restart procedure is omitted. Once the motor has restarted, control returns to step SI which is the beginning of the overload suppression routine.

At least five set points, I1, I2, I3, I4, and I5 may be preset in the control routine. These set points are related to the amplitude of the phase current. Moreover, the relative magnitudes of the set points are I3<I2<I4<I5<I1. The first set point I1 is the greatest of the five set points. The first set point I1 is related to one of (1) the rated current of the switching elements, (2) the rated current of the motor, (3) the rated current of the conducting wires, or (4) the rated current of the connectors that connect these devices. When the amplitude of the phase current exceeds first set point I1, activation of the motor is stopped. When the amplitude of the phase current falls below the least set point I3 of the five set points, the rotational frequency of motor 12 is accelerated by a predetermined acceleration. The remaining three set points I2, I4, and I5 are located between the greatest set point I1 and the least set point I3. Moreover, when the amplitude of the phase current enters one of the subintervals defined by the two intermediate set points I4 and I5, motor 12 is decelerated by a predetermined deceleration defined for each subinterval.

In step S1, if the suppression flag equals zero, or if the motor is running, the control routine proceeds to steps S2, S3, S4, and S5, in turn. In these steps, the amplitude of the phase current and the rotational velocity (rotational frequency) of the motor are measured. Further, the rotational acceleration of the motor is calculated based on the rate of change of the rotational velocity of the motor. At step S5, a constant α is chosen from a predetermined table (not shown), based on the magnitude of the rotational acceleration calculated at step S4. Each of the set points 12 through 15 are multiplied by this constant α. The magnitude of constant α is, for example, $0.9 \leq \alpha \leq 1.0$.

At step S6, a determination again is made whether or not the suppression flag equals 1. If the suppression flag equals 1, control routine proceeds to step S10, shown in FIG. 2b. Steps S10 through S18 describe processes for decelerating the rotational velocity of the motor, or for stopping the motor. With reference to FIG. 2a again, if the suppression flag equals zero at step S6, the motor state has not yet approached an overload condition, or the motor state has begun to approach an overload condition. The determination of whether or not the motor is at or near an overload condition is made by a comparison of the amplitude of the phase current with second set point αI2. The comparison is accomplished at step S7. If the amplitude of the phase current is greater than or equal to second set point αI2, the suppression flag is set at step S8. In this situation, the motor state begins to approach an overload condition or the motor state already has approached an overload condition. If the amplitude of the phase current is determined to be less than second set point αI2, control returns to step S1 with no further action. If the amplitude of the phase current is determined to be greater than or equal to second set point αI2, control returns to step S1 after processing is completed at step S8.

Control proceeds then from step SI to step S2, to step S3, to step S4, to step S5, and to step S6, again. In this iteration, the suppression flag is already set. Control routine then proceeds from step S6 to step S10, as shown in FIG. 2b. At step S10, the amplitude of the phase current is compared with a third set point αI3, in which αI3<αI2. If the amplitude of the phase current is less than the third set point αI3, the amplitude of the phase current is less than the second set point αI2. In this case, the motor state has moved away from the vicinity of an overload condition. If so, control routine then proceeds to step S11. At step S11, the rotational velocity of the motor is accelerated by an acceleration +A (rpm/sec). At step S11, if a rotational frequency command signal $N_{set}$ from an external device (not shown) is less than or equal to a rotational frequency limit $N_{limit}$, which may vary as a motor condition other than the phase current changes, the suppression flag then is reset. Moreover, control returns to step S1, which is at the beginning of the overload suppression routine.

If the amplitude of the phase current is determined to be greater than or equal to third set point αI3 at step S10, control routine then proceeds to step S12. At step S12, the amplitude of the phase current is compared with a fourth set point αI4, in which αI2<αI4. If the amplitude of the phase current is less than the fourth set point αI4, control then proceeds to step S13. At step S13, a current rotational velocity $N_{current}$ is substituted for the rotational frequency limit $N_{limit}$. Control then returns to step S1, which is at the beginning of the overload suppression routine.

If the amplitude of the phase current is greater than or equal to the fourth set point αI4, control proceeds to step S14. At step S14, the amplitude of the phase current is compared with fifth set point αI5, in which αI4<αI5. If the amplitude of the phase current is less than the fifth set point αI5, control routine proceeds to step S15. In this condition, the motor state has approached an overload condition. At step S15, rotational velocity of the motor is decelerated by a negative acceleration −B (rpm/sec). Moreover, if the rotational frequency limit $N_{limit}$ is less than or equal to the minimum rotational frequency $N_{MIN}$, which is a lowest limit constant, e.g., 700 rpm, at which the motor barely rotates smoothly, motor activation then is stopped. Further, control routine returns to step S1, which is at the beginning of the overload suppression routine.

If the amplitude of the phase current is determined to be greater than or equal to fifth set point αI5 at step S14, control routine proceeds to step S16. At S16, the amplitude of the phase current is compared with first set point I1, in which αI5<I1. If the amplitude of the phase current is less than or equal to first set point I1, control routine proceeds to step 17.

Thus, the motor state has approached closer to an overload condition. At step S17, rotational velocity of the motor is more strongly decelerated by another negative acceleration −C (rpm/sec), in which B <C. Moreover, if the rotational frequency limit $N_{limit}$ is then less than or equal to a minimum rotational frequency $N_{MIN}$, the motor activation is stopped. Then, control routine returns to step S1, which is at the beginning of the overload suppression routine. If the amplitude of the phase current is greater than first set point I1 at step S16, motor activation then is stopped at step S18. In this situation, the motor state is in an overload condition. From step S18, control routine returns to step S1, which is at the beginning of the overload suppression routine.

Operation of the control routine of the present invention may be summarized by the following tables.

| Ip < αI3 | αI3 ≤ Ip < αI2 | αI2 ≤ Ip < αI4 |
|---|---|---|
| Accelerate the motor by +A (rpm/sec), and if $N_{limit}$ ≥ $N_{set}$, then reset the suppression flag. | No adjustment. | Substitute $N_{limit}$ for $N_{current}$, and maintain the suppression flag. |

| αI4 ≤ Ip < αI5 | αI5 ≤ IP ≤ I1 | I1 < Ip |
|---|---|---|
| Set the suppression flag, and decelerate the motor by −B(rpm/sec), and if $N_{limit}$ ≤ $N_{MIN}$, then stop motor activation. | Set the suppression flag, and decelerate the motor by −C(rpm/sec), and if $N_{limit}$ ≤ $N_{MIN}$, then stop motor activation. | Set the suppression flag, and stop motor activation. |

Thus, the control routine of the present invention defines the vicinity of an overload condition by an interval between second set point αI2 and first set point I1. Moreover, within this interval, as the amplitude of the phase current approaches first set point I1, deceleration of the motor is incrementally increased (0, −B, −C). When the rotational velocity of the motor decreases; generally, the load on the motor, i.e., the amplitude of the phase current, also decreases with a certain delay. According to the present invention, because the rotational velocity of motor 12 decreases at a certain rate (i.e., deceleration), when the amplitude of the phase current approaches an overload condition, the control routine decelerates the rotational velocity of motor 12 and, thereby, reduces the amplitude of the phase current away from an overload condition. As a result, the control routine of the present invention provides a method of suppressing or reducing the frequency at which motor 12 stops, even as the motor state approaches an overload condition. Moreover, according to the present invention, the provision of an interval between third set point αI3 and second set point αI2, stabilizes the operation of the control routine of the present invention and reduces errors in the operation of the routine.

In the embodiment of the present invention described above, three subintervals are defined by disposing the fourth set point αI4 and the fifth set point αI5 between the second set point αI2 and the first set point I1. Moreover, various negative acceleration values are assigned to each of the subintervals to reduce the rotational velocity of the motor by a predetermined rate when the phase current falls within one of those subintervals. Further, the number of intervals between the second set point αI2 and the first set point I1 may be increased by introducing more set points and by assigning additional negative acceleration values to the respective subintervals formed by these additional set points. For first set point I1, the greatest value from among (1) the rated current of the motor, (2) the rated current of the switching element, (3) the rated current of the wires, and (4) the rated current of the connectors may be substituted depending upon the rated value of each of those components.

Figure 1:
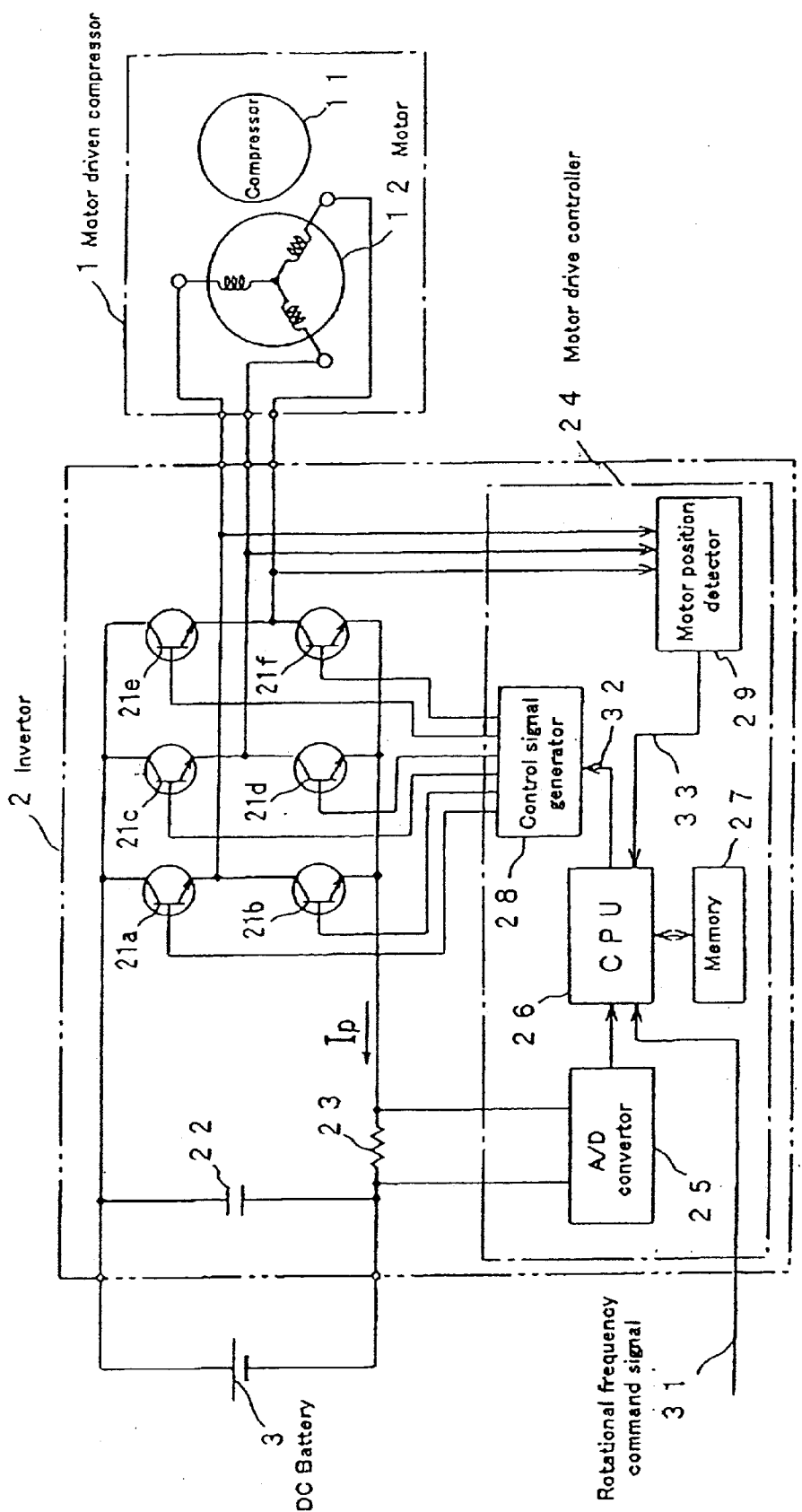
FIG. 1 is a diagram of the structure of an inverter and motor-driven compressor.

Referring again to FIG. 1, an inverter for performing the control method of the present invention is described. A motor-driven compressor 1 comprises a compressor 11 and a three-phase DC motor 12 which drives compressor 11. An inverter 2 supplies a three-phase DC current to motor 12. Inverter 2 comprises a smoothing condenser 22, three pairs of switching elements 21a–21f (e.g., NPN-type transistors), a shunt resister 23, and a motor drive controller 24. Inverter 2 is supplied with DC electric power from a DC battery 3. Moreover, motor drive controller 24 comprises a CPU 26, an A/D converter 25, a memory 27 in which a program comprising the overload suppression routine is stored, a motor position detector 29, and a control signal generator 28. When a rotational frequency command signal 31 is input to CPU 26 from an external device (not shown), CPU 26 generates a signal 32 to control signal generator 28 in accordance with a program stored in memory 27. Control signal generator 28 activates specific combinations of switching elements 21a–21f sequentially in accordance with a specific order. When switching elements 21a–21f are turned on sequentially in various combinations, three-phase DC current flows into the coils of motor 12, and motor 12 begins to rotate. As motor 12 rotates, a back-emf is detected on the terminals of motor 12. The back-emf is input to motor position detector 29, and then is translated into a signal 33 which provides an indication of a rotational position of a rotor of motor 12. When CPU 26 receives signal 33 from motor position detector 29 and calculates a rotational position of the rotor, CPU 26 generates a new signal 32 for controlling switching elements 21a–21f. Thus, CPU 26 may calculate rotational frequency of motor 12 based on signal 33 which is output from motor position detector 29. When current flows into motor 12, that current also flows through shunt resister 23, which is located on a return path of the current from motor 12. This current Ip, which flows through a shunt resister 23, is labelled a phase current. A potential difference develops across shunt resister 23. This potential difference, which is proportional to the phase current, is inputted to A/D converter 25. Thus, by monitoring the amplitude of phase current Ip, CPU 26 may control signal 32 which further controls switching elements 21a–21f so that the phase current supplied to motor 12 does not exceed a certain level. Further, unlike the known compressors described in the description of the related art, a control program with an overload suppression routine according to the present invention is provided in memory 27 of inverter 2.

As a load relating to an air conditioning parameter increases, e.g., when the ambient temperature rises, a load on compressor 11 and motor 12 also increases. As discussed previously in regards to FIG. 1, generally the phase current Ip, which flows through motor 12, is proportional to a rotational load on motor 12. By monitoring the amplitude of the phase current Ip, CPU 26 may detect whether a rotational load on motor 12 has increased.

The amplitude of the phase current Ip, which may flow through motor 12 and inverter 2, is limited by (1) a rated current of switching elements 21a–21f, (2) a rated current of motor 12, (3) a rated current of conducting wires which connect these devices, and (4) a rated current of the connectors in these devices. When the amplitude of phase current Ip exceeds a first set point I1, the overload suppression routine of the present invention stops activation of motor 12. Further, when the amplitude of the phase current Ip is less than the first set point I1, but greater than a second set point αI2, which is less than the first set point I1, the overload suppression routine decelerates the rotational velocity of motor 12 at a predetermined rate of deceleration. Moreover, when the amplitude of the phase current Ip is less than a third set point αI3, which is less than the second set point αI2, the overload suppression routine accelerates the rotational velocity of motor 12 at a predetermined acceleration. The magnitude of constant α is, for example, $0.9 \leq \alpha \leq 1.0$.

In addition, an interval between second set point αI2 and first set point I1 may be further divided into three subintervals by disposing a fourth set point αI4 and a fifth set point αI5 in between the second set point αI2 and the first set point I1. When the amplitude of phase current Ip falls within one of the subintervals formed by fourth set point αI4 and fifth set point αI5, the overload suppression routine decelerates the rotational velocity of motor 12 by a deceleration predetermined for each of the subintervals. Further, the interval between second set point αI2 and first set point I1 may be divided into more than three subintervals by disposing more than two set points in between second set point αI2 and first set point I1. Accordingly, when the amplitude of the phase current Ip falls within one of the subintervals, the overload suppression routine decelerates the rotational velocity of said motor by a deceleration predetermined for each of the additional subintervals.

Moreover, an effective value of the phase current signal output from the A/D converter 25 to the CPU 26 may be used as the representative value of the amplitude of the phase current Ip. Further, a peak value of the phase current signal output from the A/D converter 25 to the CPU 26 may be used as the representative value of the amplitude of the phase current Ip.

Although the present invention has been described in detail in connection with several preferred embodiments, the invention is not limited thereto. It will be understood by those skilled in the art that other embodiments, variations and modifications of the invention will be apparent to those skilled in the art from a consideration of this specification or practice of the invention disclosed herein, and may be made within the scope of this invention, as defined by the following claims.

What is claimed is:

1. A control device for an inverter, comprising:

switching elements for driving a three-phase DC motor in response to a rotational frequency command signal from an external device;

a calculator for calculating a rotational velocity and a rotational acceleration of said motor in response to a back-emf signal of said motor; and a detector for detecting an amplitude of a phase current of said motor, wherein, when said amplitude of said phase current exceeds a first set point I1, motor activation is stopped, and when said amplitude of said phase current is less than said first set point I1 but greater than a second set point αI2, which is less than said first set point I1, said rotational velocity of said motor is decelerated at a predetermined rate, and when said amplitude of said phase current is less than a third set point αI3, which is less than said second set point αI2, said rotational velocity of said motor is accelerated at a predetermined rate, and further wherein α is a constant.

2. The control device of claim 1, wherein,
an interval between said second set point αI2 and said first set point I1 is further divided into three subintervals by disposing a fourth set point αI4 and a fifth set point αI5 in said interval, and when said amplitude of said phase current falls in one of said subintervals, said rotational velocity of said motor is decelerated by a deceleration predetermined for each of said subintervals.

3. The control device of claim 2, wherein,
said interval between said second set point αI2 and said first set point I1 is further divided into more than three subintervals by disposing more than two set points in said interval, and when the amplitude of said phase current falls in one of said subintervals, the rotational velocity of said motor is decelerated by a deceleration predetermined for each of said subintervals.

4. The control device of claim 3, wherein,
a magnitude of said predetermined deceleration for each of said subintervals increases as said subintervals approach said first set point I1.

5. The control device of claim 1, wherein,
a value of said first set point I1 is a rated current of said motor.

6. The control device of claim 1, wherein,
a value of said first set point I1 is a rated current of said switching elements.

7. The control device of claim 1, wherein,
a value of said first set point I1 is a rated current of a wire which connects said motor and said switching elements.

8. An inverter, comprising:
a plurality of switching elements for driving a three-phase DC motor in accordance with a rotational frequency command signal from an external device;
a calculator for calculating a rotational velocity and a rotational acceleration of said motor from a back-emf signal of said motor;
a detector for detecting an amplitude of a phase current of said motor; and
a control program comprising an overload suppression routine,
wherein, when said amplitude of said phase current exceeds a first set point I1, said overload suppression routine stops activation of said motor, and when said amplitude of said phase current is less than said first set point I1, but greater than a second set point αI2, which is smaller than said first set point I1, said overload suppression routine decelerates said rotational velocity of said motor at a predetermined deceleration, and when said amplitude of said phase current is less that a third set point αI3, which is smaller than the second set point αI2, said overload suppression routine accelerates the rotational velocity of said motor at a predetermined acceleration, and further wherein α is a constant.

9. The inverter of claim 8, wherein,
an interval between said second set point αI2 and said first set point I1 is further divided into three subintervals by disposing a fourth set point αI4 and a fifth set point αI5 in said interval and when said amplitude of said phase current falls in one of said subintervals, said overload suppression routine decelerates said rotational velocity of said motor by a deceleration predetermined for each of said subintervals.

10. The inverter of claim 9, wherein,
said interval between said second set point αI2 and said first set point I1 is further divided into more than three subintervals by disposing more than two set points in said interval, and when the amplitude of said phase current falls in one of said subintervals, said routine decelerates the rotational velocity of said motor by a deceleration predetermined for each of said subintervals.

11. The inverter of claim 10, wherein,
a magnitude of said predetermined deceleration for each of said subintervals increases as said subintervals approach said first set point I1.

12. The inverter of claim 8, wherein,
a value of said first set point I1 is a rated current of said motor.

13. The inverter of claim 8, wherein,
a value of said first set point I1 is a rated current of said switching elements.

14. The inverter of claim 8, wherein,
a value of said first set point I1 is a rated current of a wire which connects said motor and said switching elements.

15. The control device of claim 1, wherein,
said constant a has a numerical value of $0.9 \leq \alpha \leq 1.0$.

16. The inverter of claim 8, wherein,
said constant α has a numerical value of $0.9 \leq \alpha \leq 1.0$.

17. A method of controlling a compressor motor that is driven by an inverter, comprising:
calculating a rotational velocity and a rotational acceleration of said motor, in response to back-emf signals of said motor;
detecting an amplitude of a phase current of said motor;
when said amplitude of said phase current exceeds a first set point I1, stopping activation of said motor;
when said amplitude of said phase current is less than said first set point I1, but greater than a second set point αI2, which is less than said first set point I1, decelerating said rotational velocity of said motor at a predetermined rate; and
when said amplitude of said phase current is less than a third set point αI3, which is less than said second set point αI2, accelerating said rotational velocity of said motor at a predetermined rate,
wherein, α is a constant.

18. The method of claim 17, wherein,
said constant α has a numerical value of $0.9 \leq \alpha \leq 1.0$.

* * * * *